United States Patent
Von Scholten (10) Patent No.: US 9,546,888 B2
(45) Date of Patent: Jan. 17, 2017

(54) RETROFITTABLE SYSTEM FOR AUTOMATIC READING OF UTILITY METERS AND A TEMPLATE FOR ALIGNING AN OPTICAL SENSOR HOUSING THEREOF

(75) Inventor: Christian Von Scholten, Rungsted (DK)

(73) Assignee: NORTHQ APS, Hellerup (DK)

( * ) Notice: Subject to any disclaimer, the term of this patent is extended or adjusted under 35 U.S.C. 154(b) by 423 days.

(21) Appl. No.: 13/819,193

(22) PCT Filed: Aug. 29, 2011

(86) PCT No.: PCT/DK2011/050325
§ 371 (c)(1),
(2), (4) Date: May 10, 2013

(87) PCT Pub. No.: WO2012/025126
PCT Pub. Date: Mar. 1, 2012

(65) Prior Publication Data
US 2013/0213156 A1    Aug. 22, 2013

(30) Foreign Application Priority Data
Aug. 27, 2010    (DK) ............................ PA 2010 70376

(51) Int. Cl.
G01D 11/24    (2006.01)
G01D 4/00    (2006.01)

(52) U.S. Cl.
CPC .............. *G01D 11/24* (2013.01); *G01D 4/008* (2013.01); *Y02B 90/247* (2013.01); *Y04S 20/50* (2013.01)

(58) Field of Classification Search
CPC ...... G01D 11/24; G01D 4/008; G01D 11/245; Y02B 90/247; Y04S 20/50
(Continued)

(56) References Cited

U.S. PATENT DOCUMENTS 4,204,115 A    5/1980    Boldridge, Jr.
5,214,587 A    5/1993    Green
(Continued)

FOREIGN PATENT DOCUMENTS

CN    1154745 A    7/1997
CN    2583634 Y    10/2003
(Continued)

OTHER PUBLICATIONS

Moghavveni, M. et al., "PIC Microcontroller-based Automatic Meter Reading (AMR) System Using a Low Voltage (LV) Power Line Network," IJE Transactions B: Applications, vol. 18, No. 1, pp. 39-50, Apr. 2005.
(Continued)

*Primary Examiner* — Natalie Huls
(74) *Attorney, Agent, or Firm* — Harness, Dickey & Pierce, P.L.C.

(57) ABSTRACT

A retrofittable system for automatic reading of a utility meter having a meter housing with at least one transparent meter housing part. The system includes an optical sensor unit adapted to detect a signal from the consumption indication of the meter. The optical sensor unit includes a sensor unit housing adapted to be mounted on the transparent meter housing part of the utility meter housing using an adhesive. The optical sensor unit includes an electrical cable connection adapted to connect the sensor unit to a data processing unit remote from the sensor unit. The processing unit includes a wireless transmission device adapted to transmit processed data from the data processing unit to a further remote device for further processing and/or display. Also disclosed is a template for aligning the optical sensor housing.

11 Claims, 7 Drawing Sheets

(58) Field of Classification Search
USPC .................................................. 73/866.5
See application file for complete search history.

(56) References Cited

U.S. PATENT DOCUMENTS

| | | | | |
|---|---|---|---|---|
| 5,289,722 | A * | 3/1994 | Walker | G01B 7/18 33/DIG. 13 |
| 5,321,351 | A * | 6/1994 | Swart et al. | 324/750.23 |
| 5,408,189 | A * | 4/1995 | Swart et al. | 324/750.22 |
| 5,506,404 | A * | 4/1996 | Milan-Kamski | G01D 4/008 250/231.14 |
| 5,836,694 | A * | 11/1998 | Nguyen | 374/130 |
| 5,874,732 | A | 2/1999 | Giles | |
| 6,100,816 | A * | 8/2000 | Moore | G01D 4/004 340/870.02 |
| 6,271,523 | B1 * | 8/2001 | Weaver | G01D 4/002 250/221 |
| 6,956,500 | B1 * | 10/2005 | Ducharme | G01D 4/008 250/215 |
| 7,174,260 | B2 | 2/2007 | Tuff et al. | |
| 7,444,247 | B2 | 10/2008 | Gagnon et al. | |
| 2002/0107659 | A1 * | 8/2002 | Vann | 702/150 |
| 2002/0109608 | A1 | 8/2002 | Petite et al. | |
| 2002/0152050 | A1 * | 10/2002 | Vann | 702/150 |
| 2002/0163442 | A1 * | 11/2002 | Fischer | G01D 4/008 340/870.02 |
| 2002/0168513 | A1 * | 11/2002 | Hattori | B32B 7/02 428/336 |
| 2003/0007124 | A1 * | 1/2003 | Levine | 351/206 |
| 2004/0246143 | A1 * | 12/2004 | Crichlow | G01D 4/008 340/870.02 |
| 2005/0030199 | A1 | 2/2005 | Petite et al. | |
| 2005/0210728 | A1 * | 9/2005 | Smith, III | 42/122 |
| 2005/0222784 | A1 | 10/2005 | Tuff et al. | |
| 2008/0028678 | A1 * | 2/2008 | Banhagel | A01G 9/02 47/73 |
| 2008/0238711 | A1 * | 10/2008 | Payne | G01D 4/008 340/870.02 |
| 2009/0058676 | A1 * | 3/2009 | Orlosky | G01D 4/004 340/870.02 |
| 2009/0153357 | A1 * | 6/2009 | Bushman | G01D 4/008 340/870.02 |
| 2009/0256719 | A1 * | 10/2009 | Boissonneault | G01D 4/008 340/870.02 |
| 2010/0253538 | A1 * | 10/2010 | Smith | G01D 4/002 340/870.02 |
| 2013/0250278 | A1 * | 9/2013 | Zhao et al. | 356/35.5 |
| 2013/0301190 | A1 * | 11/2013 | Metzger | G01D 4/002 361/679.01 |
| 2015/0084785 | A1 * | 3/2015 | Lesbirel | G01D 4/006 340/870.02 |

FOREIGN PATENT DOCUMENTS

| | | |
|---|---|---|
| CN | 201319668 Y | 9/2009 |
| DE | 202008007959 U1 | 10/2008 |
| EP | 0 547 879 | 2/1997 |
| EP | 0854557 A2 | 7/1998 |
| EP | 0 553 332 | 5/1999 |
| FR | 2614098 A1 | 10/1988 |
| FR | 2831263 A1 | 4/2003 |
| FR | 2843455 | 2/2004 |
| FR | 2867562 A1 | 9/2005 |
| WO | WO-9534836 A2 | 12/1995 |
| WO | WO 97/05572 | 2/1997 |
| WO | WO-02065423 A1 | 8/2002 |
| WO | WO 02/073137 | 9/2002 |
| WO | WO 2006/036513 | 4/2006 |
| WO | WO 2010/018197 | 2/2010 |

OTHER PUBLICATIONS

De Craemer, K. et al., "Analysis of State-of-the-art Smart Metering Communication Standards," 2010.
Tan, S. Y. et al., "An Efficient Conversion Technique Enablingan Existing Electromechanical Meter to Function as a Digital Meter in AMR," Investing in Innovation 2003, pp. 149-156.
Chinese Office Action and English translation thereof dated Dec. 2, 2014.
International Search Report PCT/ISA/210 for Denmark Patent Publication No. PA 2010 70376 dated Jan. 19, 2012.

* cited by examiner

RETROFITTABLE SYSTEM FOR AUTOMATIC READING OF UTILITY METERS AND A TEMPLATE FOR ALIGNING AN OPTICAL SENSOR HOUSING THEREOF

The present invention relates to a retrofittable system for automatic reading of utility meters.

Utility meters, such as meters for electricity, gas and water are widely used in domestic and industrial installations. Traditionally, utility meters indicate the consumption of a commodity using a counter so that at regular interval payments can be made based on manual reading made by a consumer or at trusted third party. In addition to the counter, they typically also comprise means for immediately revealing that consumption is taking place. The outset of the present invention is electricity meters. The most common type of electricity meter is the Thomson or electromechanical induction watt-hour meter. The electromechanical induction meter operates by counting the revolutions of an aluminium disc, known as a Ferraris disc, which is made to rotate at a speed proportional to the power. The rotation of the Ferraris disc is readily detectable if any significant power consumption takes place. The number of revolutions is proportional to the energy usage. The disc drives a register mechanism which integrates the speed of the disc over time by counting revolutions, in order to render a measurement of the total energy used over a period of time. Typically the total energy used is indicated by means of a number of revolving drums with numbers like an odometer of a car, or by a number of dials with hands pointing to digits. Modern electricity meters however may use a flashing LED to indicate that consumption takes place and a digital display, such as a 7 segment display.

Typically, the meter is only read at relative long intervals, e.g. once a year when requested by the supplier, in order to establish the actual consumption in that year. There are however many reasons why the utility meter should be read more frequently or even continuously.

One such reason is invoicing. Typically, the consumer pays on account payment over the year based on a predicted consumption relying on last year's consumption. Once a year the meter is read, and the on account payment regulated with respect to the actual consumption. Both the consumer and the supplier, however, have an interest in frequent and correct invoicing. If the utility meter can be remotely read and information communicated to the supplier in an easy manner, the supplier will better be able to invoice the consumer frequently and in a manner correctly reflecting the consumption.

Another reason is to increase consumer awareness in general. Consumer awareness is almost a prerequisite if a reduction or increased efficiency in consumption is to be achieved, e.g. for environmental reasons i.e. saving water, electricity and gas, the latter two reducing $CO_2$ emissions. However, out of sight is often out of mind, and the utility meters are typically quite remotely located with respect to each other and to the user's normal whereabouts in his residence, e.g. located outdoors or in the basement, so the user normally forgets to monitor them regularly, if he is not exceptionally keen on it. Moreover, if the utility meter can be remotely read and information communicated to the supplier in an easy manner, the supplier will better be able to invoice the consumer frequently and in a manner correctly reflecting the consumption.

Increased efficiency in consumption inter alia involves redistributing consumption in order to decrease peak loads, e.g. running washing machines and storage water heaters at night time, and different tariffs for e.g. electricity is an important incentive for such redistribution. This cannot be done with the traditional utility meters, such as the electricity meters described above, as they do only record accumulated consumption, but not when consumption took place. Since supplies such as electricity, gas, water are generally under relative strict political control it may also be that it is politically dictated that any consumer must have electricity meters capable of handling different tariffs, commonly referred to as smart meters. Along the same lines it may also be politically dictated that any consumer wishing to have a remotely readable electricity meter, has a right to have one. Both of the latter situations will inevitably lead to a discussion of who has to pay for the new electricity meter and the work involved in the replacement. Retrofitting of existing utility meters, in particular electricity meters, with remote reading means is therefore desirable.

One such retrofittable reader is disclosed in U.S. Pat. No. 7,444,247. This prior art reader, however, has several drawbacks. One is that, despite the fact that the intention is to use the electricity meter of U.S. Pat. No. 7,444,247 for a wide range of meters, the meter is in fact adapted to a specific type of housing of the electricity meter, where the use of a hose clamp for mounting the sensor unit only allows the reader to be mounted on electricity meters with round, e.g. cylindrical, housings, more specifically only on the periphery thereof. Moreover, because the sensors unit is mounted on the periphery of the housing the sensors of the sensor unit are located on an arm protruding in front of the electricity meter. The length of the arm has to be adapted depending on the type of meter where the sensor unit is installed and properly aligned with the Ferraris disc. This makes the sensor of the sensor unit hard to align with the meter. Also, the protruding arm is somewhat prone to accidental or willful destruction. Another drawback is the shortened battery life caused by low temperatures, when the sensor unit is located directly on an electricity meter located outdoors. To counter this, U.S. Pat. No. 7,444,247 proposes a built in temperature sensor, and reduction in data processing when it is cold, so as to save battery power.

Also, EP-A-854557 intends to provide at remote meter reading apparatus, which can be used for a wide range of meters. Nonetheless the mounting of the sensor unit involves the mounting of a template for holding the sensor unit, where the template is aligned with the Ferraris disc and clicked into place in the window. This, in turn, necessitates the existence of the window in the meter in the first place, but also necessitates some kind of edge, which the template is to engage, it is to be securely mounted. The remote reader is exclusively for electricity meters, because the sensor unit is supplied via a transformer on the mains leads, and accordingly are no considerations regarding battery life. Consequently, the remote reader is not applicable to water and gas meters where mains supply is often not present.

Based on this prior art it is the object of the invention to provide a versatile retrofittable remote reader system for a utility meter, in particular an electricity meter, which is less dependent on the housing of the meter, and may thus easily be installed on an even wider range of meters.

According to a first aspect of the present invention, this object is achieved by a retrofittable system for automatic reading of a utility meter having a meter housing with at least one transparent meter housing part using adhesive means, said system comprising an optical sensor unit adapted to detect a signal from the consumption indication of said meter, said optical sensor unit comprising a sensor unit housing adapted to be mounted on said transparent meter housing part of the utility meter housing, wherein said optical sensor unit comprising an electrical cable connection adapted to connect the sensor unit to a data processing unit remote from the sensor unit, and wherein said processing unit comprises wireless transmission means adapted to transmit processed data from said data processing unit to a further remote device for further processing and/or display.

By providing the sensor unit housing directly on said transparent meter housing part of said utility meter the mounting is no longer restricted by the external shape of the meter housing. Instead it will fit on any meter housing as long as it has a transparent meter housing part, which in practice is the case for all meter housings relying on inspection of Ferraris disc. As a bonus effect the sensor housing may even be mounted on meters without Ferraris discs, e.g. with a flashing indicator, in particular as long as a flat surface is provided around it or a transparent surface is located in front of it. In fact the surface need not be entirely, flat. Even in the case where there is a bulge around the flashing indicator the sensor or housing may med adhered sufficiently secure.

Also, by using a sensor housing containing practically only the sensor, and connecting it to a remote data processing unit, it becomes possible to locate the power consuming parts and the battery supply for these at a protected location, i.e. indoor, thus preventing the battery to be exposed to low temperatures, which could substantially reduce the battery life.

Furthermore, by using an adhesive, such as double adhesive tape, the sensor unit may be installed by the consumer himself without the use of tools and without the help of a technician.

According to a second aspect of the invention, there is provided a template for aligning an optical sensor unit housing comprising an optical sensor of a retrofittable system for automatic reading of a utility meter, with said utility meter wherein said template comprises a transparent carrier, and said template comprises an cross-shaped marking indicating vertical and horizontal direction, adapted to be optically aligned an indicator of a utility meter, in particular, but not exclusively with a Ferraris disc of an electricity meter.

This makes it very easy to install the sensor unit housing correctly. This can be done without the use of tools, and by the consumer himself without the need for calling in a skilled worker, such as an electrician.

According to a preferred embodiment of the first aspect of the invention, said sensor unit housing comprises external markings adapted to facilitate the alignment with the consumption indicator of said utility meter. This makes the correct mounting of the easy if not to say intuitive to the consumer, in particular in conjunction with the use of the template according to the second aspect of the invention. In particular, if according to another preferred embodiment of the first aspect of the invention, said markings are adapted to facilitate alignment in conjunction with a template adapted to be mounted temporarily on said transparent meter housing part.

According to a further preferred embodiment of the first aspect of the invention, the markings comprise a visor cut-out. Using a cut-out, preferably in the edge of the housing, facilitates the correct mounting as the cut-out may be used to optically align the housing correctly with the indicator of the utility meter, in particular the Ferraris disc of an electricity meter.

According to an especially preferred embodiment of the first aspect invention, the electrical cable has a length of more than 1 meter, preferably more than 3 meters and most preferred more than 5 meters. This allows the processing unit including the battery supply to be located in a protected manner. 5 meter cable is considered suffice to connect optical sensor units mounted on an electricity meter mounted in an outside wall to a door, window, basement vent or the like, or even if the meter is located on a utility pole away from the house, as it is not uncommon in the US, at least to a shed a garage or the like. The length of the cable is in any case a compromise as an important aspect of the system is that it devised in such manner that all components needed by the consumer fits in a letter, which may be sent directly to him via mail to his letterbox, i.e. without him having to be home to receive a parcel or even have to go to the post office to pick it up himself.

According to a further preferred embodiment of the first aspect of the invention, said optical sensor unit comprises an optical transmitter, and the markings on the sensor unit housing are adapted to take into account the spacing between optical sensor and the transmitter. This allows proper alignment of the sensor irrespective of whether it receives light reflected from the Ferraris disc of an electricity meter using such, or light emitted from a flashing indicator such as an (infrared) LED of an electricity meter using such.

According to a yet a further embodiment of the first aspect of the invention, the housing comprises a detector for detecting whether the sensor housing is attached to a surface. This makes it possible to detect detachment of the sensor housing from the meter housing, which, in turn, allows a corresponding warning to be issued. Preferably, the detector comprises a switch, as switches are cheap and reliable.

According to a preferred embodiment of the second aspect of the invention, the transparent carrier comprises an antistatic foil adapted to adhere to a transparent meter housing part of said utility meter without the use of an adhesive. This makes it very easy to secure the template during use, and in particular to remove it after use.

According to another preferred embodiment of the second aspect of the invention, said template comprises perforations defining a central strip, which may be removed upon breaking said perforations, so as to leave an opening in said template. This allows the consumer to easily aligning the template using the central crossing of the cross-shaped markings, and then to remove the central part of the template to create an opening through, which the optical sensor unit may be mounted on the transparent meter housing part.

According to a further preferred embodiment, the strip comprises a central part of said cross-shaped marking, and at least the width of said strip is adapted to the width of the optical sensor unit housing so as to allow placement of said optical sensor unit housing in said opening and alignment of the optical sensor housing with the remainder of the cross-shaped marking. Thus, easy access to the transparent meter housing part is gained, though an opening in the template, in which the sensor unit housing, which preferably have matching lines thereon, can be aligned with the remainder of the cross-shaped markings and mounted.

According to yet a further preferred embodiment of the second aspect of the invention, said template comprises additional markings for compensating for a predetermined spacing between the optical sensors and an optical transmitter in said optical sensor unit housing. This allows proper alignment of the sensor unit housing on both electricity meters using Ferraris discs and meters using LED indicators, using the very same template, thus widening the range of meters with which the present invention is applicable for the normal consumer.

The invention will now be described in greater detail using non-limiting exemplary embodiments and referring to the figures, in which.

Figure 1:
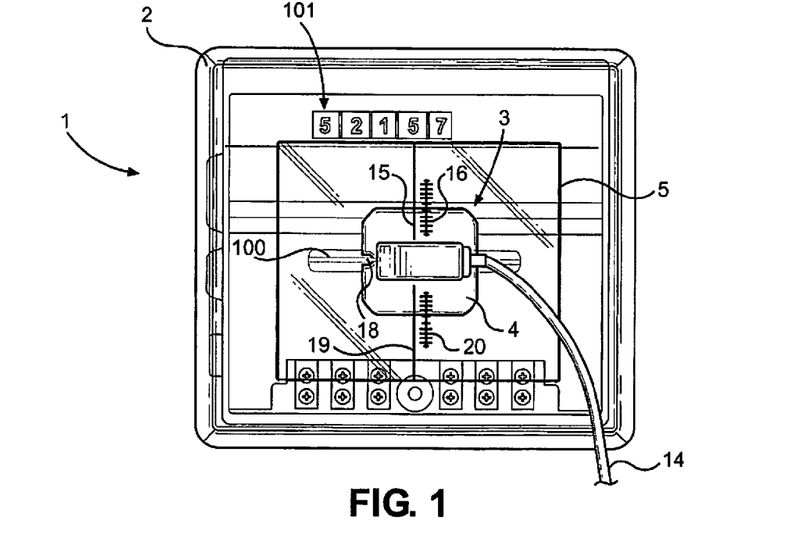
FIG. 1 shows an electricity meter with a template and a sensor unit of a retrofittable system according to the invention.

FIG. 1 shows an utility meter in the form of an electricity meter 1 with a utility meter housing with a transparent meter housing part 2 through which a Ferraris disc 100 and a five digit counter 101 is visible. On the transparent meter housing part 2 a sensor unit 3 having a sensor unit housing 4 according to the invention is has been mounted, using a transparent template 5.

Figure 2:
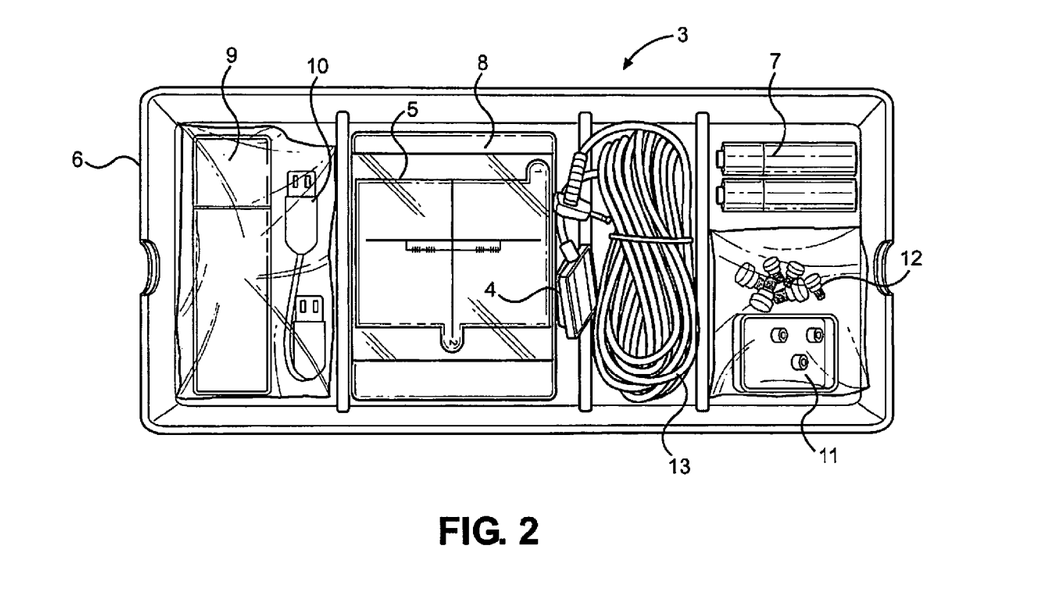
FIG. 2 shows a box containing a complete kit for the retrofitting system according to the invention.

The sensor unit 3 is part of a complete installation kit adapted to be located in a cardboard box 6 of small size allowing it to be sent as a letter in the mail, more specifically the preferred embodiment as shown in FIG. 2 is approximately 12×28×3 centimeters.

Figure 3:
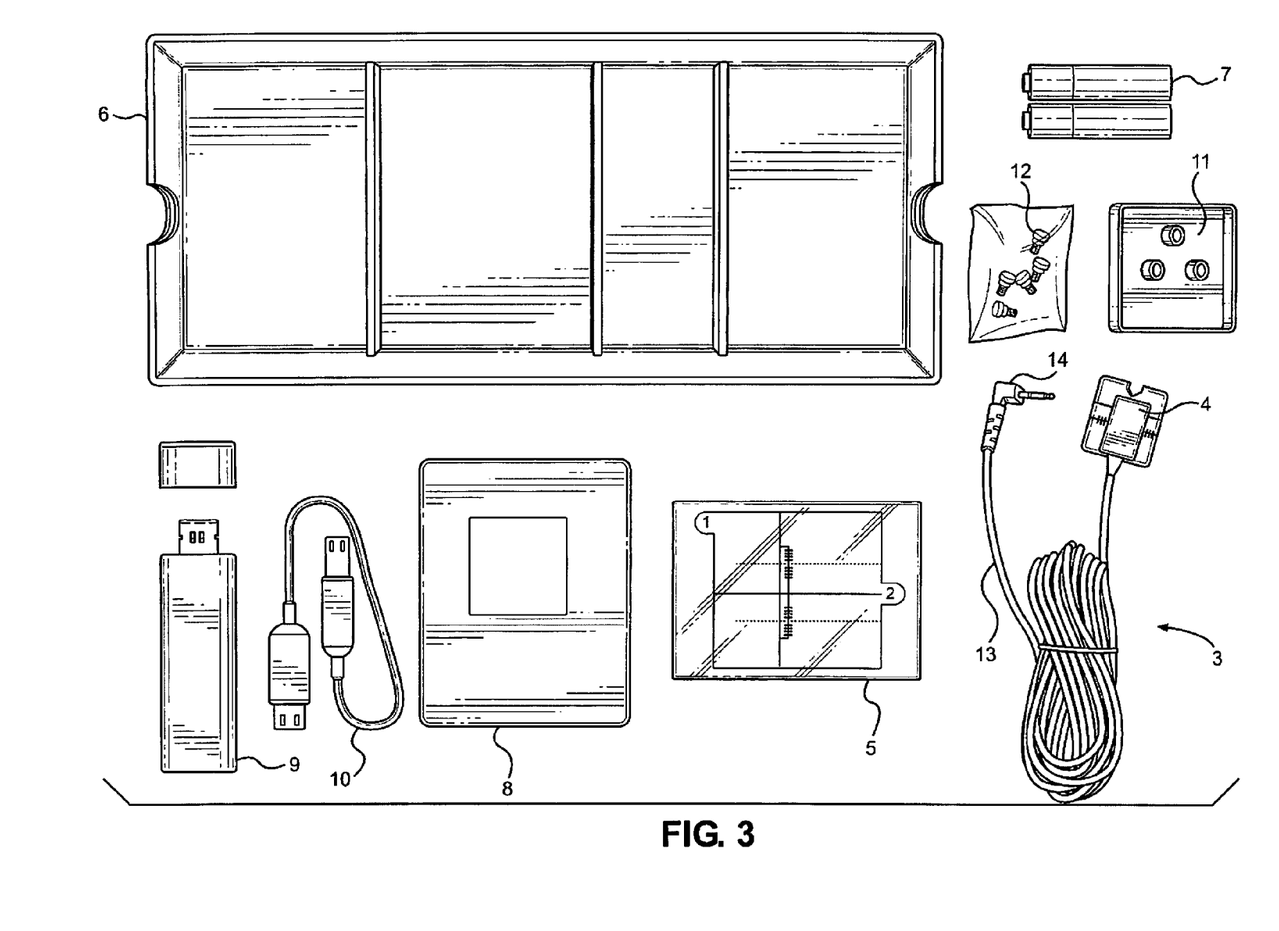
FIG. 3 shows the box of FIG. 2 with content of thereof emptied out.

The various parts of the kit are better seen in FIG. 3, and comprise two AA size batteries 7 to be inserted in and supplying a data processing unit 8, adapted to perform wireless communication with an USB based transceiver 9 to be installed on a computer, such as a PC (not shown). To prevent the USB based transceiver 9 from sticking out of the computer a short USB extension cable 10 allowing the USB based transceiver 9 to dangle from the computer instead, is also included. Though preferred, in order to prevent inadvertent damaging of the USB based transceiver 9 the USB extension cable 10 is only an optional feature, and not relevant for the invention as such. Also included is a template 5, which as can be seen from FIG. 2 where it is located on top of the processing unit 8, is transparent. Also, included is a mounting bracket 11 together with a bag 12 of mounting screws and rawl plugs, for mounting the data processing unit 8 on a wall or the like.

Figure 4:
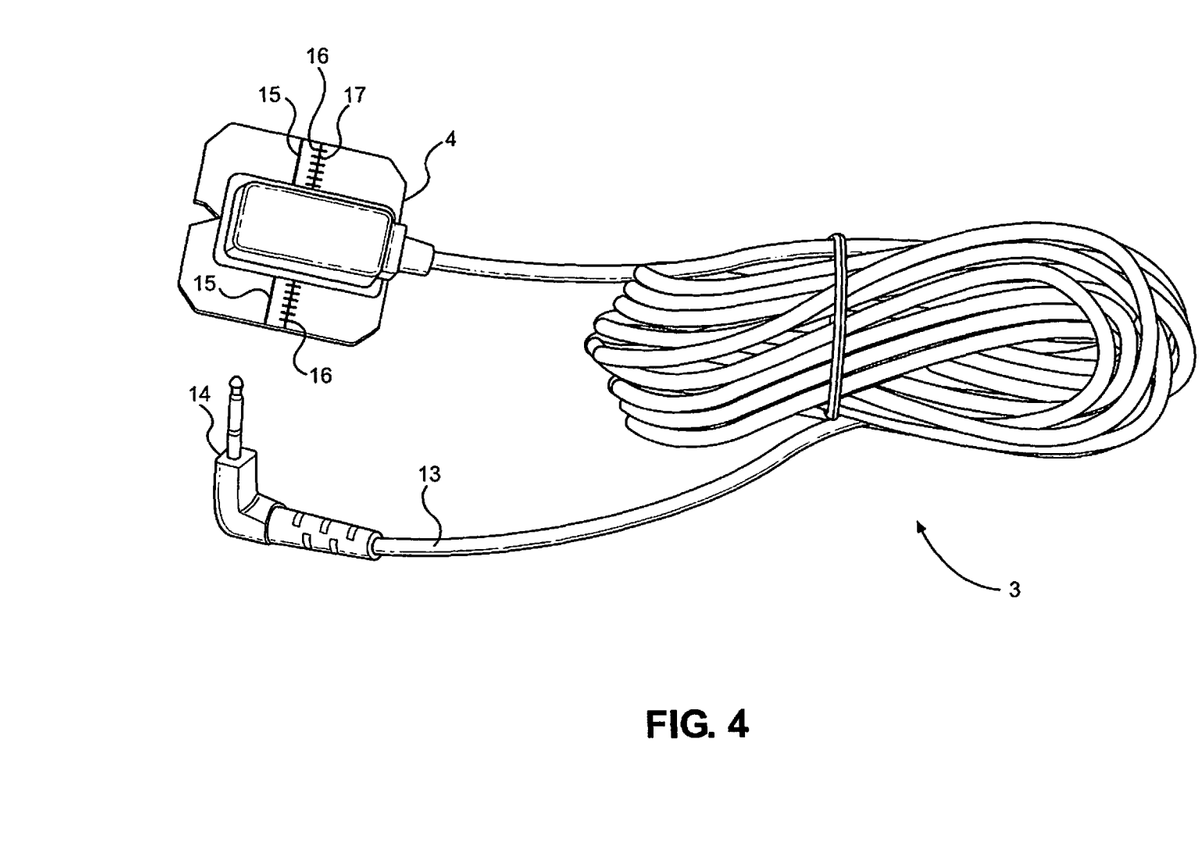
FIG. 4 shows the complete sensor unit of the invention.

As can be seen from FIGS. 2 and 3, but even better from FIG. 4 the sensor unit 3 comprises a sensor unit housing 4 and a coiled up length of cable 13 ending in a plug 14, adapted to be inserted into a socket in the data processing unit 8. The length of the cable is quite long preferably longer than one meter, more preferred longer than three meters and most preferred longer than five meters. Some costumers even request cables up to 10 meters. The long length of cable allows the data processing unit which comprises the batteries 7 to be located at a sheltered place, where the batteries are e.g. protected from cold weather, so as to prolong the battery life. Though even longer cables could be used, they are not preferred, as the intention is to supply the entire kit in one single box, capable of being delivered by mail.

In terms of power consumption the two AA size batteries 7 suffice to power the data processing unit 8 including the optical sensor unit 4 and the wireless transmitter therein for approximately ten months. Suitable warnings about low battery capacity will be transmitted to the computer, so as to warn the consumer.

In order to keep power consumption low the USB based transceiver 9 is currently preferred to use the Z Wave standard, but it may be envisaged that in situations where battery capacity is not an issue, other standards such as Wireless M-bus for gas or electricity meters specified in standard EN 13757-4, but also Zigbee or WiFi could be used. The latter would have the advantage that it could communicate directly with a controller or a wireless router, the latter of which is present in many houses anyway, and that data could be accessed for display and/or further processing from a computer that way, rather than having to install the USB based transceiver 9 on the computer. In any case the communication is preferably two-way allowing the sensor to be configured or reconfigured, whenever the sensor is in an active state, e.g. reporting various data.

Figure 5:
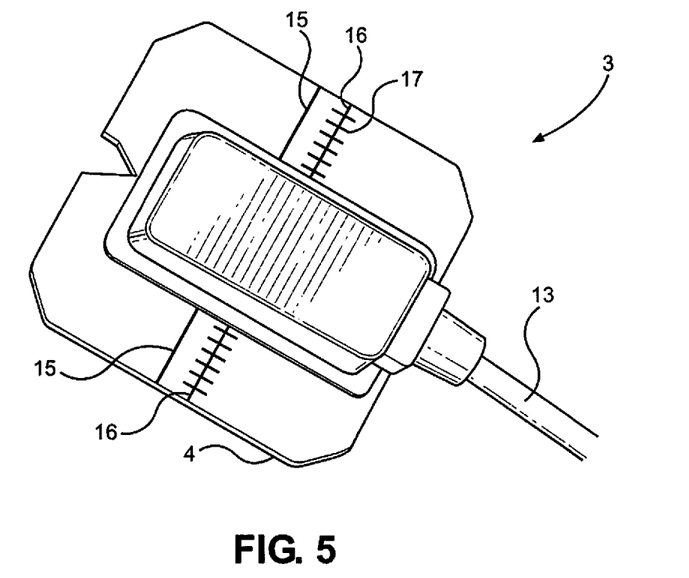
FIG. 5 shows a top perspective view of a first embodiment of the sensor unit housing according to the invention with alignment markings thereon.

Returning now to FIG. 4 it will be noted that the sensor unit housing carries markings, preferably in the form of indentations. The markings comprises two simple straight lines 15 aligned with each other, and in parallel with the lines 15, two lines 16 also aligned with each other but carrying cross-bars 17. A visor in the form of a V-shaped cut-out 18 is also provided. These lines 15 and 16 and the V-shaped cut-out 18 are better seen in FIG. 5, showing the sensor unit housing 4 in greater detail.

These lines 15 and 16, and the V-shaped cut-out 18 serve the easy and correct alignment of the sensor unit housing 4 with the indicator, such as the Ferraris disc 100 of the electricity meter 1, as can be seen in e.g. FIG. 1. In FIG. 1 it can be seen how the V-shaped cut-out 18 aligns with the Ferraris disc 100 and how the lines 15 and 16 align with corresponding lines 19 and 20 on the transparent template 5.

Figure 7:
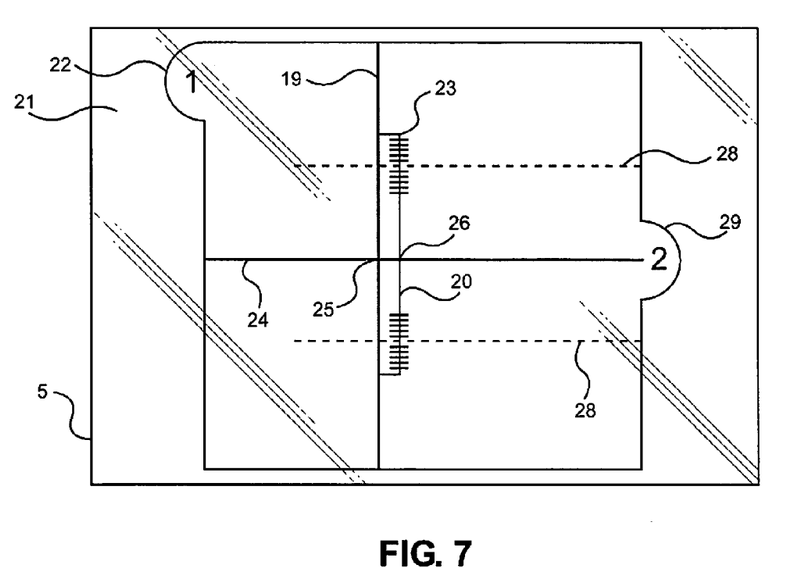
FIG. 7 shows a first embodiment of the template according to the invention.
Figure 9:
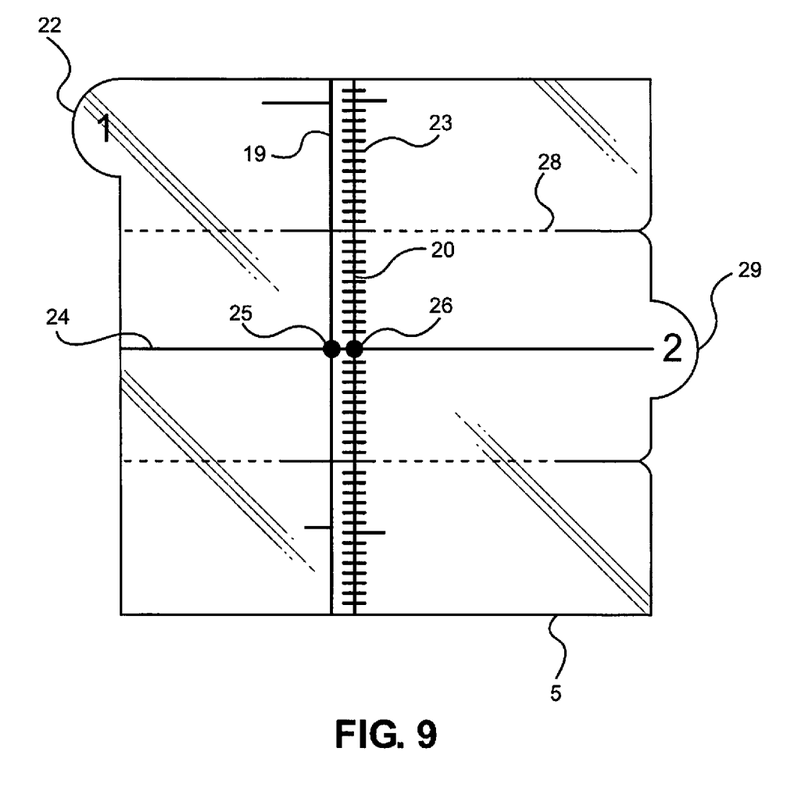
FIG. 9 shows a top perspective view of a second embodiment of the template according to the invention.

Turning now to FIG. 7, the transparent template 5 is shown in greater detail. The transparent template 5 is a generally square carrier, such as a piece of transparent antistatic plastic material of the sort capable of adhering to a surface without the use of a separate adhesive. It may thus be easily removed after use without leaving any traces of adhesive. The use of an adhesive is however also a possibility. The transparent template 5 is mounted on a release liner 21, from which it may be removed manually using a first tab 22 in one corner. The transparent template 5, comprises various markings, such as a simple vertical line 19 and an additional shorter vertical line 20 running in parallel with a section of the vertical line 19. The additional shorter vertical line 20 comprises cross-bars 23 similar to the cross-bars 17 of the line 16 on the sensor unit housing 4. The vertical line 19 and the additional shorter line 20 are crossed at right angles by a horizontal line 24 in respective intersections 25 and 26. FIG. 9 shows an alternative marking on the carrier. Since there are substantial similarities to the embodiment of FIG. 7, same reference numerals are used for similar parts. It will be noted that the intersections 25 and 26 have been enhanced by dots. Also, the vertical line 20 with the cross-bars 23 extends over the entire width of the carrier.

The carrier may further comprise text identifying the use of the lines 19 and 20 for mechanical meters and electronic meters, respectively.

Figure 8:
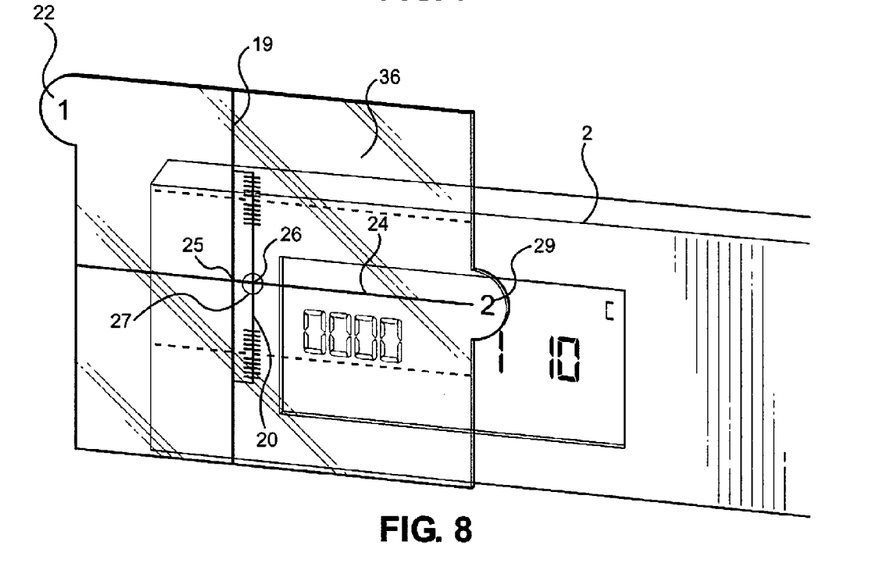
FIG. 8 shows the use of the template of FIG. 7 in conjunction with a smart meter.

When peeled from the release liner 21, the template may be placed on the electricity meter in order to correctly align and mount the optical sensor housing 4 with respect to the indicating means such as the Ferraris disc shown in FIG. 1 or as will be explained later the flashing indicator LED 27 of e.g. a smart meter, as shown in FIG. 8. Depending on the specific meter, the invention is to cover plenty of types. The intersections 25 or 26 may now be use to aim at the indicator 100 or 27 when placing the transparent template 5 on the transparent meter housing part 2. The transparent carrier comprises an antistatic foil 36 adapted to adhere to a transparent meter housing part of said utility meter without the use of an adhesive. This makes it very easy to secure the template during use, and in particular to remove it after use. The antistatic properties with then adhere the template 5 to the electricity meter 1 at the correct desired location. As can be seen from FIG. 7 the template comprises two perforations in the shape of lines 28. By pulling on a second tab 29 the template may be broken along these lines from one side all the way beyond the intersections 25 and 26, so as to leave an opening through which the sensor unit housing may now be mounted on the transparent meter housing part 2, e.g. using double adhesive self adhesive pads or tape 30 on plane bottom surfaces of the optical sensor housing 4, as indicated on the bottom view of the optical sensor housing in FIG. 6. Having provided the opening, it is easy to align the lines 15 and 16 with the remainder of lines 19 and 20, respectively.

Figure 6:
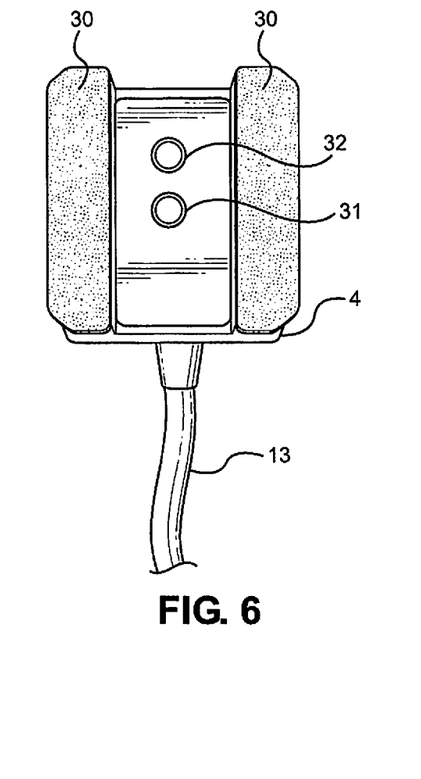
FIG. 6 shows the sensor side of the sensor unit housing.

Referring still to FIG. 6 it can be seen that sensor housing accommodates both an optical sensor 31 and a light transmitter 32 spaced a distance apart. The transmitter is necessary as the electricity meter will often be left in dark, e.g. located in a cupboard, in a room rarely lit or outside at night time, and the electricity meters 1 with Ferraris discs 100 as illustrated in FIG. 1 do not provide any light. This is different with the smart meter 1 of FIG. 8 where the indicator is a flashing LED. In the first case it may be useful not to provide the optical sensor directly over the closest point of the Ferraris disc to the optical sensor 31, but have it displaced a little so as to better allow the light emitted from the light transmitter 32 shine on it. This deliberate misalignment can readily be achieved by aligning the simple lines 15 with the remainder of line 20 with the cross-bars 23.

As mentioned the lighting conditions of the electricity meter 1 are far from constant. Though this may be a minor problem for the smart meter 1 of FIG. 8, where a LED which flashes with unchanged power day or night, the situation is quite different with the Ferraris disc 100 the meter 1 of FIG. 1. Here the lighting condition may range from utter darkness to setting evening sun hitting the disk of an electricity meter 1 located outdoors facing west. The data processing unit 8 therefore constantly recalibrates the transmission intensity of the light transmitter 32 to use minimum power, in order to prolong battery life.

The data processing unit 8 also comprises processing algorithms for positive and detection correct detection of the markings of the Ferraris disc. Depending on the actual make and model of the electricity meter, these markings may differ. Some use notches in the disc some use coloured markings and such as lines or vice versa, i.e. gaps in colours segments of the periphery. Some old meters even have a disc composed from several pieces, thus leaving cracks that may give rise to false detections. The processing algorithms are adapted to deal with these and provide correct readings, even when the disc suddenly changes it angular velocity.

Figure 10:
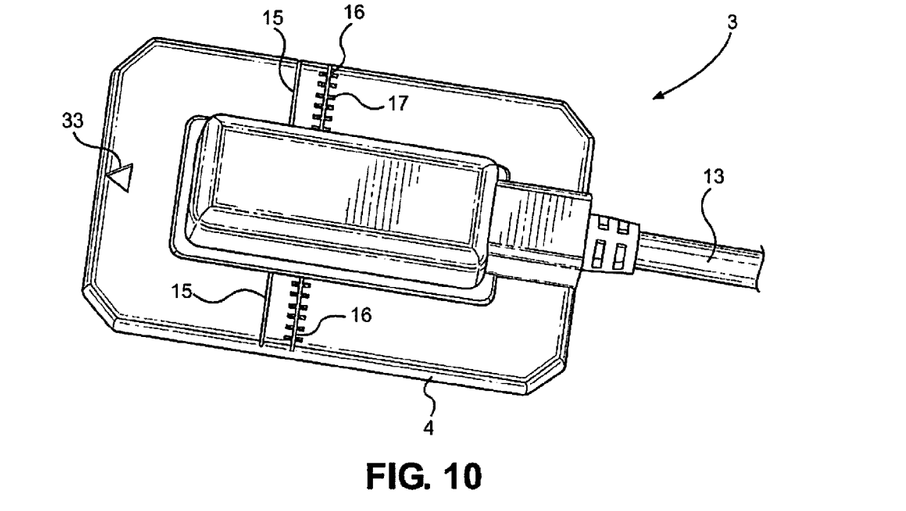
FIG. 10 shows a top perspective view of a second embodiment of the sensor unit housing with alignment markings thereon.
Figure 11:
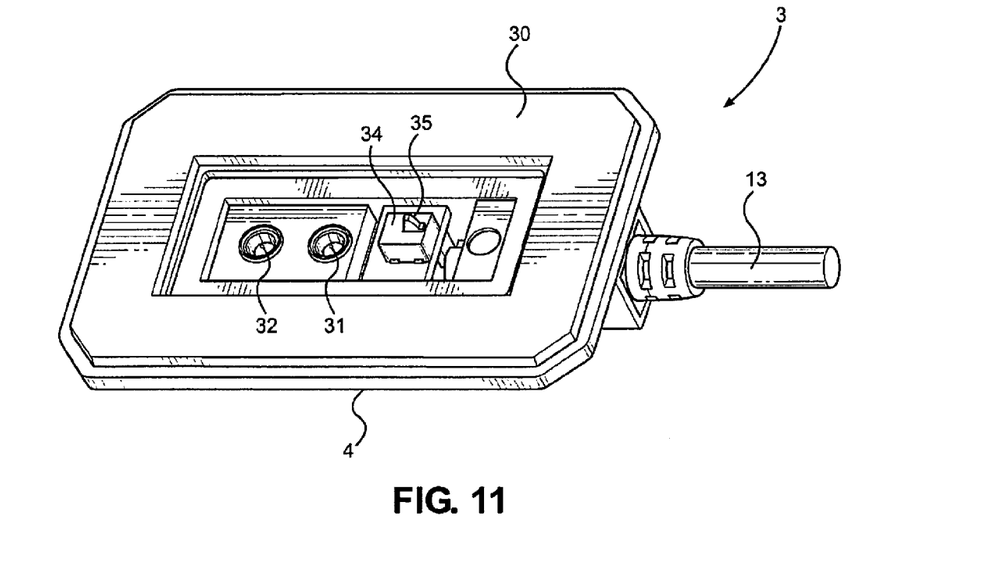
FIG. 11 shows a bottom perspective view of a second embodiment of the sensor unit housing with alignment markings thereon.

FIGS. 10 and 11 show an alternative embodiment of the sensor unit 3. Since there are substantial similarities to the embodiments of FIGS. 5 and 6, same reference numerals are used for similar parts. Also in this embodiment, the sensor unit housing carries markings, preferably in the form of indentations. The markings comprises two simple straight lines 15 aligned with each other, and in parallel with the lines 15, two lines 16 also aligned with each other but carrying cross-bars 17. These lines may be used for alignment with the templates 5 of FIG. 7 or 9 in the manner described above in conjunction with FIG. 7.

Instead of the visor-like V-shaped cut-out 18 a simple indentation 33 in form of a triangle is provided. This triangle 33 is however only an optional alternative to the preferred V-shaped cut-out, which generally allows better aiming and alignment with the Ferraris disc or the like of the utility meter. The lines 15 and 16, and the triangle serve the easy and correct alignment of the sensor unit housing 4 with the indicator, such as the Ferraris disc 100 of the electricity meter 1, in a manner similar to that found in FIG. 1. The triangle 33, however being used instead of the V-shaped cut-out 18 to align the housing 4 with the Ferraris disc 100 of an electricity meter or a similar disc of another type of utility meter. The lines 15 and 16 align with corresponding lines 19 and 20 on the transparent template 5 in the same manner as already described.

Referring now to FIG. 11, it can be seen that next to the optical sensor 31 and the light transmitter 32, the sensor housing 4 accommodates a switch 34 with an operating member 35. The operating member 35 protrudes over the self adhesive tape or pad 30. Accordingly, the operating member is depressed when the sensor unit 3 is mounted on the utility meter housing 2. If the sensor housing 4 gets detached from the meter, the operating member 35 will return to the position shown in FIG. 11. The switch 34 can serves as a detector for the detachment of the sensor from the meter housing 2, and an appropriate warning can be issued. This in turn, can serve as a tamper warning for the utility, but also simply to alert the user and secure that appropriate measures, such as reattachment, can be performed. Preferably the switch is a simple electromechanical switch, but other switches and detectors could be used.

The invention claimed is:

1. A retrofittable system for automatic reading of a utility meter having a meter housing with at least one transparent meter housing part, said system comprising:
   an optical sensor unit to detect a signal from a consumption indication of said meter,
   an optical sensor unit housing of the optical sensor unit adapted to be mounted on said transparent meter housing part of the utility meter housing using an adhesive,
   wherein said optical sensor unit includes an electrical cable connection comprising an electrical cable adapted to connect the optical sensor unit to a data processing unit remote from the sensor unit,
   wherein said processing unit includes at least one wireless transmission device adapted to transmit processed data from said data processing unit to a further remote device, said optical sensor unit housing including external markings adapted to, in conjunction with a transparent template, be mounted temporarily on said transparent meter housing part, to facilitate the alignment with the consumption indicator of said utility meter,
   wherein said transparent template includes a cross-shaped marking indicating vertical and horizontal direction, adapted to be optically aligned with an indicator of the utility meter, and wherein said transparent template comprises perforations defining a central strip, which is removable upon breaking said perforations, so as to leave an opening in said transparent template.

2. A retrofittable system according to claim 1, wherein said external markings comprises a visor cut-out.

3. A retrofittable system according to claim 1, wherein the electrical cable has a length of more than 1 meter.

4. A retrofittable system according to claim 3, wherein the electrical cable has a length of more than 3 meters.

5. A retrofittable system according to claim 4, wherein the electrical cable has a length of more than 5 meters.

6. A retrofittable system according to claim 1, wherein said optical sensor unit housing comprises an optical transmitter, and wherein the external markings on the optical sensor unit housing are adapted to take into account the spacing between optical sensor unit and the transmitter.

7. A retrofittable system according to claim 1, wherein the optical sensor unit housing comprises a detector for detecting whether the optical sensor unit housing is attached to a surface.

8. A retrofittable system according to claim 7, wherein said detector comprises a switch.

9. A retrofittable system according to claim 1, wherein said transparent template comprises a transparent antistatic foil adapted to adhere to a transparent meter housing part of said utility meter without the use of an adhesive.

10. A retrofittable system according to claim 1, wherein said strip comprises a central part of said cross-shaped marking, and at least a width of said strip is adapted to a width of the optical sensor unit housing so as to allow placement of said optical sensor unit housing in said opening and alignment of the optical sensor housing with the remainder of the cross-shaped marking.

11. A retrofittable system according to claim 1, wherein said transparent template comprises additional markings for compensating for a predetermined spacing between the optical sensor and an optical transmitter in said optical sensor unit housing.

* * * * *